United States Patent [19]

Moore

[11] Patent Number: 4,694,045

[45] Date of Patent: Sep. 15, 1987

[54] BASE RESISTANT FLUOROELASTOMERS

[75] Inventor: Albert L. Moore, Wilmington, Del.

[73] Assignee: E. I. Du Pont de Nemours and Company, Wilmington, Del.

[21] Appl. No.: 873,165

[22] Filed: Jun. 17, 1986

Related U.S. Application Data

[63] Continuation-in-part of Ser. No. 807,611, Dec. 11, 1985, abandoned.

[51] Int. Cl.$^4$ .............. C08F 214/26; C08F 214/18; C08F 210/02; C08F 259/08
[52] U.S. Cl. ............................... 525/276; 526/247
[58] Field of Search .................. 526/247; 525/276

[56] References Cited

U.S. PATENT DOCUMENTS 4,028,431  6/1977  Futami et al. ............... 525/199
4,035,565  7/1977  Apotheker et al. ........... 526/249
4,281,092  7/1981  Breazeale .................. 526/247

FOREIGN PATENT DOCUMENTS 0044613  1/1982  European Pat. Off.
2822116  11/1978  Fed. Rep. of Germany.

Primary Examiner—Carman J. Seccuro

[57] ABSTRACT

A base resistant, substantially amorphous fluoroelastomer comprising (1) 10–40 mole percent ethylene units, (2) 32–60 mole percent tetrafluoroethylene units, (3) 20–40 mole percent perfluoro(alkyl vinyl ether) units wherein the alkyl group contains 1–5 carbon atoms, and (4) a cure-site monomer. Such fluoroelastomers are resistant to attack by amines, strong bases and hydrogen sulfide and possess a combination of good low temperature and high temperature properties and they are resistant to oil swell.

13 Claims, No Drawings

BASE RESISTANT FLUOROELASTOMERS

BACKGROUND OF THE INVENTION

This application is a continuation-in-part of Application Ser. No. 807,611, filed Dec. 11, 1985, now abandoned.

This invention relates to substantially amorphous fluoroelastomers resistant to attack by amines, strong bases and hydrogen sulfide and, at the same time, the fluoroelastomers possess a combination of good low temperature and high temperature properties and they are resistant to oil swell.

Vinylidene fluoride-based polymers, such as copolymers of vinylidene fluoride and hexafluoropropylene, optionally containing tetrafluoroethylene, have achieved outstanding commercial success. However, in certain applications in which these fluoroelastomers are in contact with amines or strong bases at high temperatures, the fluoroelastomers are attacked by these materials and they lose their elastomeric characteristics principally by becoming hard and brittle. Such is the case when vinylidene fluoride-based fluoroelastomers are used as seals in oil drilling operations where the fluoroelastomer is exposed to a combination of both high and low temperatures, amines and hydrogen sulfide, all of which are associated with oil well drilling environments. Other fluoroelastomers that are known to be resistant to attack by amines, such as copolymers of tetrafluoroethylene/propylene, cannot be used successfully where long term resistance to low temperature is required because these copolymers lose their flexibility at low temperatures and, further, since these fluoroelastomers contain a relatively large amount of propylene, they tend to swell in the presence of oil and, consequently, increase in size.

U.S. Pat. No. 4,585,306 (EP No. 92,675) discloses an optical material which is a terpolymer comprising ethylene, at least one of tetrafluoroethylene and chlorotrifluoroethylene and an olefin having at least one fluoroalkyl group such as perfluoroalkylvinyl ether. These polymers do not contain a cure-site monomer and usually are crystalline plastics due to the quantities of ethylene and perfluoroalkylvinyl ether present in the composition.

Fluoroelastomers that contain ethylene and perfluorovinyl ethers at a molar ratio of ethylene to perfluorovinyl ether of 95:5 to 30:70 where the total content of ethylene plus perfluorovinyl ether is at least 70 mole percent are disclosed in U.S. Pat. No. 4,368,308. Such polymers are difficult to prepare commercially because the combination of ethylene and perfluorovinyl ether is not readily polymerizable to sufficiently high molecular weights and, additionally, high levels of expensive perfluorovinyl ether monomer must be used to attain a satisfactory fluorine content.

In the case of copolymers of ethylene/tetrafluoroethylene/perfluoro(alkyl vinyl ether)/cure-site monomer of the present invention having levels of 32-60 mole percent tetrafluoroethylene units, polymerization occurs more readily because of the reactivity of the tetrafluoroethylene monomer and high molecular weight fluoroelastomers are easily obtained. The high level of tetrafluoroethylene units incorporated in the fluoroelastomer gives the desired high level of fluorine.

Vinylidene fluoride-based fluoroelastomers which do not contain a cure-site monomer can be cured by conventional techniques by employing crosslinking agents such as diamines and bisphenols. However, the fluoroelastomers of the present invention that have a base-resistant polymer backbone cannot be cured by in a practical manner by conventional techniques mentioned above, unless a cure-site monomer is incorporated in the polymer.

The substantially amorphous, curable fluoroelastomers of the present invention have good low temperature properties since they have glass transition temperatures of $-10°$ C. or below, while at the same time, the fluoroelastomers are especially resistant to swelling when in contact with oil. Furthermore, the fluoroelastomers of the present invention have excellent high temperature properties, solvent resistance and, most importantly, they are resistant to attack by strong base and amines.

SUMMARY OF THE INVENTION

The present invention is directed to a base resistant, substantially amorphous fluoroelastomer consisting essentially of (1) 10-40 mole percent ethylene units, preferably 20-40 mole percent, (2) 2-60 mole percent tetrafluoroethylene units, (3) 20-40 mole percent perfluoro(alkyl vinyl ether) units, preferably 20-35 mole percent, wherein the alkyl group contains 1-5 carbon atoms, and (4) a cure-site monomer. Depending on the type of cure-site monomer present, the fluoroelastomers can be cured by free radical procedures, i.e. peroxide cures, or chemical crosslinking reactions, e.g., diamine cures or bisphenol cures. Preferably, peroxide-curable cure-site monomers, especially bromine-containing olefins having 2-20 carbon atoms, are incorporated in the polymers.

The amorphous fluoroelastomers are especially useful for the manufacture of O-rings or shaft seals used, for example, in oil drilling apparatus where the elastomeric seals employed in such hostile environments must have long-term resistance at both low temperatures and high temperatures in aqueous or organic fluids containing strong base, amines or hydrogen sulfide.

DESCRIPTION OF PREFFERED EMBODIMENTS

The fluoroelastomers of the present invention must contain 10-40 mole percent ethylene units, preferably 20-40 mole percent, 32-60 mole percent tetrafluoroethylene units, 20-40 mole percent perfluoro(alkyl vinyl ether) units, preferably 20-35 mole percent, and up to 3 mole percent of a cure-site monomer. The perfluoro(alkyl vinyl ethers) that can be used in this invention usually contain alkyl groups having 1-5 carbon atoms, preferably 1-3 carbon atoms, and most preferably the perfluoro(alkyl vinyl ether) is perfluoro(methyl vinyl ether) because it is more readily polymerizable to allow preparation of high molecular weight fluoroelastomers. Representative perfluoro(alkyl vinyl ethers) include perfluoro(methyl vinyl ether), perfluoro(ethyl vinyl ether), perfluoro(propyl vinyl ether), perfluoro(butyl vinyl ether), perfluoro(pentyl vinyl ether). To obtain fluoroelastomers with lower glass transition temperatures, up to about 5 mole percent of perfluoro(alkoxy alkyl vinyl ether) units can be substituted for the perfluoro(alkyl vinyl ether) units and, therefore, the term amounts of up to about 5 mole percent of perfluoro(alkoxy alkyl vinyl ethers). Representative perfluoro(alkoxy alkyl vinyl ethers) wherein the alkoxy and alkyl groups each contain 1-5 carbon atoms that can be used in this invention include perfluoro-(2-n-propoxypropyl vinyl ether), perfluoro(3-methoxy-propyl vinyl ether), perfluoro(2-methoxypropyl vinyl ether) and perfluoro(2-methoxyethyl vinyl ether). If the fluoroelastomers of this invention contain more than 40 mole percent ethylene or less than 20 mole percent perfluoro(alkyl vinyl ether) then they are unsatisfactory because the fluoroelastomers are not sufficiently amorphous. If the fluoroelastomer contains more than about 3 mole percent cure-site monomer, polymerization to the desired high molecular weight is difficult and the vulcanizate crosslinked density is too high for practical use as an elastomer. The fluoroelastomers of the present invention have good low temperature properties, i.e., the fluoroelastomers have glass transition temperatures (Tg), measured by a Differential Scanning Calorimeter in the heating mode at the onset of transition, of $-10°$ C. or below, generally within a range of $-10°$ to $-20°$ C.

The fluoroelastomers of the present invention contain a cure-site monomer. The cure-site monomer is present in the fluoroelastomer in amounts up to about 3 mole percent. Generally, at least 0.2 mole percent of cure-site monomer is present in the fluoroelastomer and, usually, not more than about 2 mole percent is required to be present in the fluoroelastomer. Various cure-site monomers can be incorporated into the backbone of the fluoroelastomer. Representative cure-site monomers include brominated or iodinated alpha-olefins containing 2-20 carbon atoms, or halogenated vinyl ethers, of the formulae:

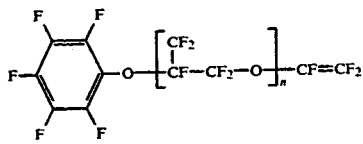

where n is 1 or 2,

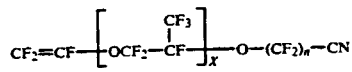

where n is 1 to 4, and X is 1 to 2,

where Y is chlorine, bromine or iodine, X is hydrogen or fluoride and n is 1 to 9. Preferably, the cure-site monomer is one that imparts peroxide curability to the fluoroelastomer, such as bromine-containing olefins or iodine-containing olefins. Peroxide-curable fluoroelastomers are preferred because of the enhanced hydrolytic stability of the vulcanizate. The term "bromine-containing olefin" or "iodine-containing olefin" as used herein means an olefin in which at least one hydrogen atom has been replaced with a bromine atom or an iodine atom, respectively, and optionally, one or more of the remaining hydrogen atoms have been replaced with an atom of another halogen, preferably fluorine. Some compounds of this type are available commercially and others can be prepared by methods known in the art, for example, as shown by Tarrant and Tandon, J. Org. Chem. 34, 864 (1969) and by Fainberg and Miller, 79 JACS 4170 (1957) and J. Org. Chem. 42 1985-90 (1977). Representative bromine-containing olefins which are copolymerizable with the monomers used to form the fluoroelastomers of this invention include bromotrifluoroethylene, 1-bromo-2,2-difluoroethylene, 4-bromo-3,3,4,4-tetrafluorobutene-1, vinyl bromide, 1-bromo-1,2,2-trifluoroethylene, perfluoroallyl bromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-5,5,6,6-tetrafluoro-hexene, 4-bromo-perfluorobutene-1, and 3,3-difluoroallylbromide. It is preferable to use sufficient units of the brominated olefin to provide at least 0.05 weight percent bromine, usually about 0.3-1.5 weight percent bromine, in the fluoroelastomer. The fluoroelastomers contain up to 3 mole percent, based on the total moles of the fluoroelastomer, of units derived from the bromine-containing olefin, usually at least about 0.2 mole percent. Bromine-containing olefins used in this invention are further described in U.S. Pat. No. 4,214,060. Representative iodine-containing olefins in amounts up to 3 mole percent which are copolymerizable with the monomers used to form the fluoroelastomers of this invention include compounds of the formula $CH_2=CH(CF_2)_xI$ where x is 2-6, more specifically, iodoethylene, 3-chloro-4-iodo-3,4,4-trifluorobutene, 2-iodo-1,1,2,2-tetrafluoro-1-(vinyloxy)ethane, 2-iodo-1-(perfluorovinyloxy)-1,1,-2,2-tetrafluoroethylene, 1,1,2,3,3,3-hexafluoro-2-iodo-1-(perfluorovinyloxy)propane, 2-iodoethyl vinyl ether, 3,3,4,5,5,5-hexafluoro-4-iodopentene, iodotrifluoroethylene, and preferably 4-iodo-3,3,4,4-tetrafluorobutene-1.

Additional cure-site monomers that can be incorporated in the fluoroelastomers described herein are halogenated vinyl ethers represented by the formula:

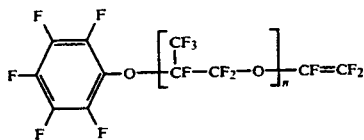

where n is 1 or 2. The fluoroelastomer containing these monomers are cured by the addition of aliphatic diamines containing 2-20 carbon atoms or hydrazine or bisphenols, preferably, in amounts of from 0.2-1 mole percent. Such cure-site monomers and their preparation are described in Pattison, U.S. Pat. No. 3,467,638.

Other representative cure-site monomers that can be incorporated into the fluoroelastomers of the present invention have the formula:

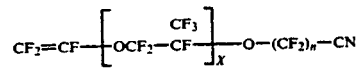

where n is 1 to 4, preferably 2 to 3 and x is 1 to 2, preferably 1. These cure-site monomers are incorporated into the fluoroelastomers preferably in amounts of from 0.2-1 mole percent. The fluoroelastomers of this invention containing such cure sites are cured by the addition of 1-5 parts per hundred parts polymer of tetraphenyl tin. Such cure-site monomers and their preparation are described in U.S. Pat. No. 4,281,092.

Other compounds useful as cure-site monomers for the fluoroelastomers of this invention are represented by the formula:

where Y is chlorine, bromine or iodine; X is hydrogen or fluorine; and n is 1 to 9. These cure-site monomers are usually used in amounts of from 0.2-3 mole percent. Representative examples include 2-chloroethyl vinyl ether and perfluoro(2-bromoethyl vinyl ether). Such fluoroelastomers containing these cure sites are peroxide curable.

The fluoroelastomers of this invention are prepared by polymerizing ethylene, tetrafluoroethylene, perfluoroalkyl perfluorovinyl ether, and a cure-site monomer, by emulsion processes in which all the monomers are continuously added to the reactor in much the same manner, and under substantially the same conditions, as described in Apotheker et al., U.S. Pat. No. 4,035,565, especially Example 1. For further details on such emulsion polymerization processes see also Moore, U.S. Pat. No. 3,839,305 and Gladding et al., U.S. Pat. No. 3,707,529.

More specifically, in preparing the fluoroelastomer to be used in the present invention, it is preferred that the reaction mixture of monomer components also contains a free-radical initiator, and the polymer-forming reaction is carried out as a free-radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example, sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used in combination with a suitable surfactant such as ammonium perfluoro-octanoate. The surfactant can be selected from those known to be useful in the manufacture of fluoroelastomers. A surfactant is present when using an inorganic initiator. A buffer, such as disodium phosphate, can be added to control the pH within a range of 3-7. Optionally, a known chain transfer agent can be present during the emulsion polymerization reaction. Examples of such chain transfer agents include diiodomethane, isopropanol, diethyl malonate, methylene bromide.

After completion of the emulsion polymerization reaction, the fluoroelastomer can be isolated from the resulting polymer latex by known methods, for example, by coagulation by adding an electrolyte or by freezing, followed by centrifuging or filtering and then drying the fluoroelastomer.

The polymer-forming reaction can also be carried out in bulk, or in an organic liquid containing an organic free-radical initiator.

During preparation of the fluoroelastomer, the reaction mixture is preferably heated in a reactor which has been flushed with an inert gas at about 40°-130° C. under superatmospheric pressure, for example, under a pressure of about 0.7-14 MPa, preferably about 3-10 MPa. In some of the most useful procedures, the polymerization is carried out as a continuous process and the reaction mixture has an average residence time in the reactor of about 0.5 to 5 hours. Residence time can be calculated by dividing the reactor volume by the volume of latex produced per hour.

The fluoroelastomer in the majority of cases will have an inherent viscosity of about 0.2 dl/g or higher, with special preference for an inherent viscosity of about 0.3-1 dl/g. Inherent viscosities of the fluoroelastomers can be measured at 30° C. at a fluoroelastomer concentration of 0.2% by weight in a solvent consisting of 60/40/3 volume ratio of heptafluoro-2,3,3-trichlorobutane, perfluoro(butyltetrafluorohydrofuran) and ethylene glycol dimethyl ether.

Optionally, at least one metal compound selected from divalent metal oxides or divalent metal hydroxides is frequently blended with the fluoroelastomer during preparation or before it is cured. These metal compounds absorb certain gases and acidic materials which are evolved during vulcanization that can chemically attack and weaken the fluoroelastomer. The presence of such compounds improves the heat aging resistance and thermal stability of the polymer. Representative metal compounds include the oxides and hydroxides of magnesium, zinc, calcium, or lead. A metal salt of a weak acid can be used along with the oxide and/or hydroxide. Representative metal salts of weak acids include barium-, sodium-, potassium-, lead- and calcium-/-stearate, -benzoate, -carbonate, -oxalate and -phosphite. Lead oxide is especially preferred. The metal compound is added to the fluoroelastomer in an amount equal to about 1-15%, preferably amount 2-10%, by weight of the fluoroelastomer.

When a peroxide is used as the curing agent, conventional coagents that are polyunsaturated compounds and cooperate with the peroxide curative to provide a useful cure can be added to the fluoroelastomer composition to increase its cure rate. The amount of coagent added to the composition is, generally, between about 0.25-10, usually 0.5-5 parts per 100 parts fluoroelastomer. Representative coagents well known in the art that can be used in the invention are described in U.S. Pat. No. 4,214,060. Especially effective coagents include triallyl isocyanurate, triallyl cyanurate, trivinyl isocyanurate and trimethallyl isocyanurate.

The fluoroelastomers can also contain conventional fillers such as carbon black, silica, clay and talc; other fillers, pigments, antioxidants, stabilizers and the like can be used. It is particularly advantageous to add carbon black to the fluoroelastomer to increase its modulus. Usually amounts of from 5-50 parts per hundred parts fluoroelastomer are used with the particular amount determined from the particle size of the carbon black and the desired hardness of the cured composition.

The following examples illustrate preferred embodiments of the invention.

EXAMPLE 1

A continuous emulsion polymerization was carried out in a well-stirred 2.0-liter stainless steel reaction vessel. The reactor was filled with an aqueous solution containing 2.2 g ammonium persulfate (APS) and 0.6 g sodium sulfite initiator components, 2.0 g ammonium perfluorooctanoate (FC-143) soap, and 10.0 g disodium hydrogen phosphate heptahydrate buffer per liter of deionized water. The reactor was heated to 90° C. and the aqueous solution was fed at 1.00 liter/hour (solution was split into two streams, one containing APS and the other the remaining components). The reactor was kept liquid-full at 6.3 MPa by means of a back-pressure control valve in the effluent line. After one hour the polymerization reaction was started by introducing a gaseous monomer mixture of approximately 20 g/h ethylene, 110 g/h tetrafluoroethylene, and 150 g/h perfluoro(methyl vinyl ether) fed through a diaphragm compressor. After four hours, 4-bromo-3,3,4,4-tetrafluorobutene-1 was introduced to the reactor at a rate of approximately 3 g/h. After an equilibration period of two hours, the effluent polymer latex was collected for four hours.

The polymer latex was separated from residual monomers in a degassing vessel at atmospheric pressure. The latex had a pH of 4.5 and contained about 15% solids. The fluoroelastomer was isolated from the latex by reducing the pH to about 3 with dilute nitric acid and coagulating with a calcium nitrate solution. The coagulated polymer was allowed to settle and was washed by reslurrying in water twice before filtering. The wet crumb was dried in an air oven at 50°–60° C. to a moisture content of less than 1%. The fluoroelastomer had the following composition as determined by elemental analysis and $^{19}F$ nuclear magnetic resonance spectroscopy:

| Monomer | Wt % | Mole % |
|---|---|---|
| Ethylene | 6 | 21 |
| Tetrafluoroethylene | 51 | 53 |
| Perfluoro(methyl vinyl ether) | 42 | 26 |
| 4-bromo-3,3,4,4-tetrafluorobutene-1 | 1.4 | 0.7 |

The glass transition temperature (Tg) was −18° C. and crystallinity was negligible, as determined by differential scanning calorimetry (DSC) (heating mode, 10° C./min, onset of transition). The inherent viscosity of the fluoroelastomer was 0.51 dL/g, measured at 30° C. at a polymer concentration of 0.2 g/dL in a solvent consisting of 60/40/3 volume ratio of heptafluoro-2,3,3-trichlorobutane, perfluoro(butyltetrahydrofuran) and ethylene glycol dimethyl ether. The Mooney viscosity of the fluoroelastomer measured as ML-10 (121° C.) was 48.

A curable fluoroelastomer composition was prepared by mixing the following ingredients on a two-roll rubber mill whose rolls were heated to about 30° C.: 100 parts fluoroelastomer of Example 1, 30 parts MT carbon black, 3 parts lead oxide (litharge), 3 parts triallyl isocyanurate, and 3 parts "Luperco" 101-XL peroxide [45% of 2,5-dimethyl-2,5-di(t-butyl peroxy)hexane and 55% inert filler]. Cure characteristics of the composition were measured with an oscillating disk rheometer (ODR) at a cure time of 12 minutes at 177° C., according to ASTM D-2084. The time required to reach 90% of the cure state reached in 12 minutes was determined as $t_c90$ was 6.0 minutes. Test samples were press-cured for 15 minutes at 177° C. and post-cured in a circulating air oven for 24 hours at 232° C. Stress-strain properties were determined according to ASTM D-412 as: 100% modulus, $M_{100}$=4.8 MPa; tensile strength at break, $T_B$=10.0 MPa; elongation at break, $E_B$=220%. Good low-temperature flexibility was indicated by a Clash-Berg temperature of −9° C. (temperature at which flex modulus reaches 10,000 psi or 69 MPa).

EXAMPLE 2

A fluoroelastomer was prepared as described in Example 1, except as follows: The aqueous solution was fed at 0.80 L/h for a nominal residence time of 2.5 h in the 2.0-L reactor. The components of the aqueous solution were fed to the reactor at rates of 2.1 g/h ammonium persulfate, 10.0 g/h disodium phosphate buffer, and 0.8 g/h ammonium perfluorooctanoate soap. The gaseous monomers were fed to the reactor at rates of 20 g/h ethylene, 75 g/h tetrafluoroethylene, and 155 g/h perfluoro(methyl vinyl ether). The 4-bromo-3,3,4,4-tetrafluorobutene-1 cure-site monomer was fed at a rate of 3.2 g/h. After equilibration for ten hours, the latex was collected for sixteen hours. The unreacted offgas amounted to 57 g/h and had a composition of 0.0% ethylene, 13.5% tetrafluoroethylene and 86.5% perfluoro(methyl vinyl ether) as determined by gas chromatography. The polymerization rate was approximately 196 g/h at a conversion of 77%. The effluent latex had a pH of 3.9 and contained 19.0% solids.

The isolated fluoroelastomer had the following composition:

| Monomer | Wt % | Mole % |
|---|---|---|
| Ethylene | 11 | 35 |
| Tetrafluoroethylene | 35 | 33 |
| Perfluoro(methyl vinyl ether) | 54 | 32 |
| 4-bromo-3,3,4,4-tetrafluorobutene-1 | 1 | 0.4 |

The inherent viscosity was 0.64 dl/g and the Mooney viscosity ML-10 (121° C.) was 42. The glass transition temperature was −15° C. and crystallinity was negligible.

One hundred parts of the fluoroelastomer described above was compounded on a two-roll rubber mill heated to about 30° C. with 25 parts MT black, 5 parts calcium hydroxide, 5 parts triallyl isocyanurate (TAIC), and 3 parts Luperco 101-XL peroxide. The cure characteristics of the composition were measured with an oscillating disc rheometer (ODR) for 30 minutes at 177° C. according to ASTM D-2084 which indicated that optimum cure time $t_c90$ was 4.3 minutes. Test samples were press-cured for 30 minutes at 177° C. and postcured for 24 hours at 200° C. Stress-strain propoerties according to ASTM D-412 were measured: $M_{100}$=9.0 MPa, $T_B$=18.6 MPa, and $E_B$=190%. A sample which was exposed to an aqueous solution of 50% sodium hydroxide and 0.2% quaternary amine salt for 3 days at 150° C. retained reasonable stress-strain properties: $T_B$=7.4 MPa, $E_B$=100%. A similarly exposed control vulcanizate of a commercial vinylidene fluoride-containing fluoroelastomer was reduced to tar.

EXAMPLES 3 TO 6

Fluoroelastomers were made by continuous emulsion polymerization in a well-stirred 4.0-liter stainless steel reaction vessel, under the conditions described in Table I. In each run, the reactor was filled with an aqueous solution containing ammonium persulfate initiator, Na$_2$HPO$_4$.7H$_2$O buffer, and ammonium perfluorooctanoate soap (FC-143). The reactor was heated to the desired operating temperature and goal feed rate of aqueous solution was established for one hour. The reactor was kept liquid-full at 6.3 MPa by means of a back-pressure control valve in the effluent line. The reaction was started by introducing a monomer gas mixture [ethylene, tetrafluoroethylene, and perfluoro(methyl vinyl ether)] fed through a diaphragm compressor. After 0.5 hour, 4-bromo-3,3,4,4-tetrafluorobutene-1 was introduced as a 50 volume % solution in tertiary-butanol. After a prescribed equilibration period, the effluent latex was collected as noted in the Table. The latex was degassed and the polymer was isolated as described in Example 1. The polymerization results and polymer characteristics are listed in Table I. All polymers were amorphous elastomers.

TABLE I

| Example | 3 | 4 | 5 | 6 |
|---|---|---|---|---|
| Polymerization: | | | | |
| Temperature, °C. | 90 | 90 | 100 | 100 |
| Residence time, h | 3.2 | 3.3 | 4.0 | 4.0 |
| Aq. sol'n feed, L/h | 1.25 | 1.20 | 1.00 | 1.00 |
| Ammonium persulfate, g/h | 2.7 | 3.0 | 1.6 | 1.6 |
| $Na_2HPO_4 \cdot 7H_2O$, g/h | 15 | 20 | 15 | 15 |
| Ammonium perfluorooctanoate, g/h | 1.5 | 3.2 | 2.7 | 2.7 |
| Monomer feed g/h | | | | |
| Ethylene | 33 | 23 | 21 | 17 |
| TFE[1] | 126 | 198 | 131 | 138 |
| PMVE[2] | 247 | 242 | 210 | 197 |
| BTFB[3] | 8.1 | 6.2 | 5.3 | 5.2 |
| Total | 414 | 469 | 367 | 357 |
| Run duration, h | | | | |
| Equilibration Period | 9 | 5 | 6 | 6 |
| Collection | 24 | 30 | 24 | 20 |
| Offgas, g/h | 122 | 113 | 99 | 99 |
| Wt % | | | | |
| Ethylene | 0.1 | 0.0 | 0.1 | 0.0 |
| TFE | 14.2 | 16.6 | 14.7 | 16.0 |
| PMVE | 85.7 | 83.4 | 85.2 | 84.0 |
| Latex | | | | |
| % Solids | 18.8 | 23.7 | 21.9 | 21.2 |
| pH | 4.4 | 4.7 | 4.9 | 6.5 |
| Polym'n rate, g/h | 290 | 355 | 268 | 257 |
| Conversion, % | 70 | 76 | 73 | 72 |
| Polymer: Composition | | | | |
| Wt % | | | | |
| Ethylene | 11.4 | 6.4 | 7.8 | 6.7 |
| TFE | 37.2 | 50.5 | 43.6 | 47.4 |
| PMVE | 48.9 | 41.5 | 46.9 | 44.0 |
| BTFB | 2.5 | 1.6 | 1.7 | 1.9 |
| Mole % | | | | |
| Ethylene | 37.4 | 22.9 | 27.7 | 24.1 |
| TFE | 34.3 | 51.0 | 43.3 | 48.1 |
| PMVE | 27.2 | 25.3 | 28.2 | 26.9 |
| BTFB | 1.1 | 0.8 | 0.8 | 0.9 |
| Viscosity | | | | |
| Inherent Visc., dL/g | 0.59 | 0.48 | 0.54 | 0.72 |
| ML-10 (100° C.) | | 56 | 60 | 85 |
| ML-10 (121° C.) | 40 | 29 | 36 | 56 |
| DSC | −12 | −13 | −16 | −18 |
| Tg C | | | | |

[1] TFE is tetrafluoroethylene
[2] PMVE is perfluoro(methyl vinyl ether)
[3] BTFB is 4-bromo-3,3,4,4-tetrafluorobutene-1

TABLE II

| | Curing of Compositions of Fluoroelastomers of Examples 3–6 | | | |
|---|---|---|---|---|
| Example | 3 | 4 | 5 | 6 |
| Composition | | | | |
| Polymer | 100 | 100 | 100 | 100 |
| MT Black | 25 | 30 | 30 | 30 |
| Litharge (PbO) | | 3 | 3 | 3 |
| Calcium Hydroxide | 5 | | | |
| TAIC[4] | 5 | | | |
| TMAIC[5] | | 3 | 2.5 | 2.5 |
| Luperco 101-XL[6] | 3 | 5 | 5 | 5 |
| Proton Sponge[7] | | | 0.5 | 0.5 |
| TMS[8] | | 0.8 | | |
| ODR, 30 min/177° C. | | | | |

TABLE II-continued

| | Curing of Compositions of Fluoroelastomers of Examples 3–6 | | | |
|---|---|---|---|---|
| Example | 3 | 4 | 5 | 6 |
| (ASTM D-2084) | | | | |
| $M_L$, N.m | 0.8 | 0.42 | 0.34 | 0.52 |
| $M_H$, N.m | 4.5 | 5.63 | 4.28 | 5.83 |
| $t_{90}$, minutes | 5.1 | 9.3 | 8.6 | 7.7 |
| Stress/strain, press cured 15 min/177° C. and post-cured 24 h/232° C. (ASTM D-412) | | | | |
| Original | | | | |
| $M_{100}$, MPa | 11.0 | 10.6 | 8.3 | 13.8 |
| $T_B$, MPa | 18.1 | 16.3 | 15.2 | 19.9 |
| $E_B$, % | 160 | 140 | 150 | 130 |
| Heat aged, Air oven, 70 h/275° C. | | | | |
| $M_{100}$, MPa | 3.8 | 4.2 | 3.1 | 4.8 |
| $T_B$, MPa | 5.7 | 7.7 | 7.7 | 9.2 |
| $E_B$, % | 205 | 195 | 230 | 180 |
| Hardness, Shore A | 75 | 81 | 75 | 79 |
| % Compression Set (ASTM D-395, Method B) | | | | |
| 70 h/25° C. | 28 | 34 | 26 | 23 |
| 70 h/200° C. | 73 | 36 | 31 | 27 |
| Clash-Berg, °C. | −8 | −7 | −10 | −12 |

[4] TAIC is triallyl isocyanurate
[5] TMAIC is trimethallyl isocyanurate
[6] 45% 2,5-dimethyl-2,5-di(t-butyl peroxy)hexane and 55% inert filler
[7] 1,8-bis(dimethylamino)napthalene
[8] TMS is tetramethylene sulfone

EXAMPLE 7

A peroxide-curable fluoroelastomer was prepared as described in Example 1 except that the aqueous solution was fed at 1.20 L/h for a nominal residence time of 1.67h in the 2.0-liter reactor. Components of the aqueous solution were fed to the reactor at a rate of 3.0 g/h ammonium persulfate, 14.0 g/h disodium phosphate buffer, and 1.8 g/h ammonium perfluorooctanoate soap. Gaseous monomers were fed to the reactor at rates of 29 g/h ethylene, 146 g/h tetrafluoroethylene, and 200 g/h perfluoro(methyl vinyl ether). The cure-site monomer, 4-iodo-3,3,4,4-tetrafluorobutene-1 (ITFB), was fed to the reactor at a rate of 2.4 g/h in a 15 volume % solution in tertiary butyl alcohol. After an equilibration period of six hours, the effluent latex was collected for six hours. The unreacted offgas from the degasser amounted to 84 g/h and had a composition of 0.0% ethylene, 17.6% tetrafluoroethylene, and 82.4% perfluoro(methyl vinyl ether) by weight. The polymerization rate was 293 g/h at a conversion of 78%. The effluent latex had a pH of 5.5 and contained 20.3% solids.

The isolated fluoroelastomer had the following composition:

| Monomer | Wt % | Mol % |
|---|---|---|
| Ethylene | 11 | 35 |
| Tetrafluoroethylene | 42 | 39 |
| Perfluoro(methyl vinyl ether) | 47 | 26 |
| ITFB | 0.5 | 0.2 |

The inherent viscosity was 0.37 dL/g and the Mooney viscosity ML-10(100° C.) was 16. The glass transition temperature was −12° C. and crystallinity was negligible.

A curable fluoroelastomer composition was prepared by mixing the following ingredients on a two-roll rubber mill whose rolls were heated to about 30° C.: 100 parts fluoroelastomer of Example 8, 30 parts MT carbon black, 3 parts lead oxide (litharge), 3 parts triallyl isocyanurate, and 3 parts "Luperco" 101-XL peroxide [45% of 2,5-dimethyl-2,5-di(t-butyl peroxy)hexane and 55% inert filler]. The cure characteristics of the composition were measured with an oscillating disk rheometer (ODR) at a cure time of 30 minutes at 177° C., according to ASTM D-2084. The time required to reach 90% of the cure state reached in 12 minutes was determined as $t_{c90}=2.3$ minutes. Test samples were press-cured for 30 minutes at 177° C. and post-cured 18 hours at 204° C. Stress-strain properties were determined according to ASTM D-412 as: 100% modulus, $M_{100}=7.9$ MPa; tensile at break, $T_B=9.0$ MPa; elongation at break, $E_B=1300\%$.

EXAMPLE 8

A fluoroelastomer was made as described in Examples 3–6 except that the aqueous solution was fed to a 4.0 liter reactor at a rate of 1.20 L/h for a nominal residence t of 3.3 h. Components of the aqueous solution were fed to the reactor at rates of 3.0 g/h ammonium persulfate, 13.0 g/h disodium phosphate buffer, and 2.7 g/h ammonium perfluorooctanoate soap. The gaseous monomers were fed to the reactor at rates of 21 g/h ethylene, 145 g/h tetrafluoroethylene, and 227 g/h perfluoro(methyl vinyl ether). The cure-site monomer, perfluoro(8-cyano-5-methyl-3,6-dioxa-1-octene) [8-CNVE] was fed to the reactor at a rate of 7.4 g/h. After an equilibration period of three hours at 80° C., the effluent latex was collected for six hours. The unreacted offgas amounted to 141 g/h and had a composition of 0% ethylene, 17% tetrafluoroethylene, and 83% perfluoro(methyl vinyl ether). The polymerization rate was about 256 g/h at a conversion of 64%.

The isolated fluoroelastomer had the following composition:

| Monomer | Wt % | Mol % |
| --- | --- | --- |
| Ethylene | 8 | 28 |
| Tetrafluoroethylene | 47 | 46 |
| Perfluoro(methyl vinyl ether) | 43 | 25 |
| 8-CNVE | 1.6 | 0.4 |

The polymer had a Mooney viscosity ML-10(100° C.) of 72 and a glass transition temperature of −14° C. with negligible crystallinity. The polymer containing 8-CNVE is curable using tetraphenyl tin as catalyst.

EXAMPLE 9

A peroxide-curable fluoroelastomer was prepared as described in Example 1 with the following exceptions. The 4.0-liter reactor was filled with an aqueous solution of 2.0 g ammonium persulfate, 2.4 g ammonium perfluorooctanoate and 12.0 g disodium hydrogen phosphate heptahydrate buffer per liter of deionized water at 79° C. An aqueous solution was introduced to the reactor at a rate of 0.50 L/h with components comprising 1.0 g/h ammonium persulfate, 6.0 g/h disodium phosphate buffer, and 1.2 g/h ammonium perfluorooctanoate soap. After one hour, monomers were added at rates of 8 g/h ethylene, 52 g/h tetrafluoroethylene, 73 g/h perfluoro(methyl vinyl ether), 25 g/h perfluoro(2-propoxy propyl vinyl ether) [PHVE], and 1.6 g/h 4-bromo-3,3,4,4-tetrafluorobutene-1 (BTFB). After an equilibration period of two hours, the effluent latex was collected for eight hours. After that time no further monomers were added and the latex remaining in the reactor was combined with that previously collected. The offgas during the last two hours amounted to 19 g/h and had a composition of 0% ethylene, 6% tetrafluoroethylene, and 94% perfluoro(methyl vinyl ether). The polymerization rate was approximately 124 g/h at a conversion of 77%. The fluoroelastomer was isolated as described in Example 1.

The polymer had the following composition:

| Monomer | Wt % | Mol % |
| --- | --- | --- |
| Ethylene | 6 | 24 |
| Tetrafluoroethylene | 41 | 44 |
| Perfluoro(methyl vinyl ether) | 45 | 29 |
| PHVE | 7 | 2 |
| BTFB | 1.2 | 0.6 |

The polymer had a Mooney viscosity ML-10(100° C.) of 15 and a glass transition temperature of −19° C., with negligible crystallinity.

I claim:

1. A base resistant, substantially amorphous fluoroelastomer consisting essentially of (1) 10–40 mole percent ethylene units, (2) 32–60 mole percent tetrafluoroethylene units, (3) 20–40 mole percent perfluoro(alkyl vinyl ether) units wherein the alkyl group contains 1–5 carbon atoms, and (4) 0.2-3 mole percent of a cure-site monomer, said fluoroelastomer having a glass transition temperature below about −10° C.

2. A fluoroelastomer of claim 1 wherein the perfluoro(alkyl vinyl ether) units are perfluoro(methyl vinyl ether).

3. A fluoroelastomer of claim 1 consisting essentially of (1) 20–40 mole percent ethylene units, (2) 32–60 mole percent tetrafluoroethylene units, 20–35 mole percent perfluoro(alkyl vinyl ether) units, and (4) a peroxide curable cure-site monomer.

4. A fluoroelastomer of claim 3 wherein the perfluoro(alkyl vinyl ether) units are perfluoro(methyl vinyl ether).

5. A fluoroelastomer of claim 1 wherein the cure-site monomer is a bromine-containing olefin containing 2-20 carbon atoms.

6. A fluoroelastomer of claim 1 wherein the cure-site monomer is an iodine-containing olefin containing 2-20 carbon atoms.

7. A fluoroelastomer of claim 1 wherein the cure-site monomer is a halogenated vinyl ether of the formula:

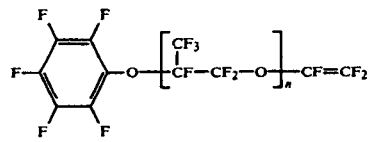

where n is 1 or 2.

8. A fluoroelastomer of claim 1 wherein the cure-site monomer is a halogenated vinyl either of the formula:

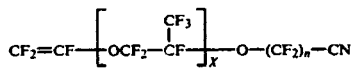

where X is 1 to 2, and n is 1 to 4.

9. A fluoroelastomer of claim 1 wherein the cure-site monomer is a halogenated vinyl ether of the formula:

$$CX_2=CXO(CX_2)_nCX_2Y$$

where Y is chlorine, bromine or iodine, X is hydrogen or fluorine and n is 1 to 9.

10. A fluoroelastomer of claim 5 wherein the bromine-containing olefin is 4-bromo-3,3,4,4-tetrafluorobutene-1.

11. A fluoroelastomer of claim 8 wherein the halogenated vinyl ether is perfluoro-(8-cyano-5-methyl-3,6-dioxa-1-octene).

12. A fluoroelastomer of claim 5 containing a polyunsaturated compound that is a coagent and capable of cooperating with a peroxide curing agent.

13. A fluoroelastomer of claim 12 wherein the polyunsaturated compound is trimethallylisocyanurate or triallylisocyanurate.

* * * * *